United States Patent
Dietz

(10) Patent No.: US 7,844,391 B2
(45) Date of Patent: Nov. 30, 2010

(54) START-UP TIME MEMORY UNIT FOR MOTOR VEHICLES

(75) Inventor: Volker Dietz, Hoechstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 12/606,791

(22) Filed: Oct. 27, 2009

(65) Prior Publication Data

US 2010/0049427 A1 Feb. 25, 2010

Related U.S. Application Data

(63) Continuation of application No. PCT/EP2008/003975, filed on May 16, 2008.

(30) Foreign Application Priority Data

Jun. 2, 2007 (DE) .................. 10 2007 025 925

(51) Int. Cl.
*G06F 19/00* (2006.01)
(52) U.S. Cl. ...................................... 701/113
(58) Field of Classification Search .............. 701/113, 701/115
See application file for complete search history.

(56) References Cited

U.S. PATENT DOCUMENTS 5,163,408 A 11/1992 Nemoto

| | | | |
|---|---|---|---|
| 6,618,666 B2 * | 9/2003 | Amano et al. ............... | 701/113 |
| 6,763,903 B2 | 7/2004 | Morimoto et al. | |
| 7,487,266 B2 * | 2/2009 | Wakabayashi ............... | 710/21 |
| 2002/0013655 A1 | 1/2002 | Amano et al. | |
| 2003/0120419 A1 | 6/2003 | Dery | |

FOREIGN PATENT DOCUMENTS

| | | |
|---|---|---|
| DE | 41 34 522 A1 | 4/1992 |
| DE | 197 01 809 C1 | 8/1998 |
| DE | 100 15 319 A1 | 11/2000 |
| DE | 101 61 343 A1 | 7/2002 |
| DE | 102 11 462 C1 | 7/2003 |
| DE | 10 2007 025 692 A1 | 1/2008 |
| DE | 10 2007 009 836 A1 | 9/2008 |
| EP | 1 746 544 A1 | 1/2007 |
| JP | 2-33436 A * | 2/1990 |

OTHER PUBLICATIONS

German Search Report dated Nov. 23, 2007 including partial English translation (Nine (9) pages).
International Search Report dated Oct. 24, 2008 including English translation (Six (6) pages).

* cited by examiner

*Primary Examiner*—Hieu T Vo
(74) *Attorney, Agent, or Firm*—Crowell & Moring LLP

(57) ABSTRACT

A control unit controls a start-up process of a vehicle power plant in a motor vehicle. In response to a start-up request, the control unit emits a start-up signal for initiating corresponding start-up measures for starting up the vehicle power plant. The control unit determines a time duration from the beginning of the start-up process up to the completion of a successful start-up process and sends a time duration dependent memory signal to the memory unit, which thereupon makes a time duration dependent memory entry.

23 Claims, 3 Drawing Sheets

|  | SP↓ |  |
|---|---|---|
| Time duration t of the last start in ms | 1,530 | 1 |
| Number of starts with a time duration t > TG2 | 523 | 2 |
| Kilometer reading km of the last start | 20,100 | 3 |
| Normal start m (= 0) or fast start a (= 1) of the last start | 0 | 4 |
| Causes at the last start | 00100 | 5 |
| Kilometer reading km of the second to the last start | 16,543 | 6 |
| Normal start m (= 0) or fast start a (= 1) of the second to the last start | 1 | 7 |
| Causes at the second to the last start | 10,000 | 8 |
| Number of starts with a time duration TG2 >= t > TG1 | 1,232 | 9 |
| Kilometer reading km of the last start | 3,122 | 10 |
| Normal start m (= 0) or fast start a (= 1) of the last start | 1 | 11 |
| Causes at the last start | 10,000 | 12 |
| Kilometer reading km of the second to the last start | 3,120 | 13 |
| Normal start m (= 0) or fast start a (= 1) of the second to the last start | 1 | 14 |
| Causes at the second to the last start | 10,000 | 15 |
| Number of starts with a time duration t <= TG1 | 78,000 | 16 |
| Kilometer reading km of the last start | 22,134 | 17 |
| Normal start m (= 0) or fast start a (= 1) of the last start | 1 | 18 |
| Kilometer reading km of the second to the last start | 22,133 | 19 |
| Normal start m (= 0) or fast start a (= 1) of the second to the last start | 1 | 20 |

↑IF ↑SPF

Fig. 2

AG ↓
| Information about the last start-up with a time duration t > TG2: | |
|---|---|
| Kilometer reading km of the last start-up: | 20,100 km |
| Type of start-up: | normal start |
| Causes for the prolonged start-up duration: | |
| Cause 1: 0 | |
| Cause 2: 0 | |
| Cause 3: 1 | |
| Cause 4: 0 | |
| Cause 5: 0 | |

Fig. 3

START-UP TIME MEMORY UNIT FOR MOTOR VEHICLES

CROSS-REFERENCE TO RELATED APPLICATIONS

This application is a continuation of PCT International Application No. PCT/EP2008/003975, filed May 16, 2008, which claims priority under 35 U.S.C. §119 to German Patent Application No. DE 10 2007 025 925.7, filed Jun. 2, 2007, the entire disclosures of which are herein expressly incorporated by reference.

BACKGROUND AND SUMMARY OF THE INVENTION

The invention relates to a control unit for controlling a start-up process of a vehicle power plant in a motor vehicle.

In principle, the vehicle power plant, which is usually designed as an internal combustion engine, is started by the driver of the vehicle. To this end, a key, which is provided for this purpose, is inserted into a corresponding lock, and this key is rotated in order to start the internal combustion engine; or an existing push button for activating the internal combustion engine is activated. In response, corresponding measures for starting the internal combustion engine are initiated. Such a start-up process of the internal combustion engine is referred to as the "normal start" or the "key start."

In order to reduce fuel consumption and pollutant emissions, the current trend is to develop methods and systems (and to some extent they have also been already installed) that automatically switch-off the electric motor, the hybrid engine or the internal combustion engine, thus, the power plant of a motor vehicle, under certain conditions and/or in the presence of defined shut-off conditions and automatically re-start the electric motor, the hybrid engine or the internal combustion engine in the presence of defined start-up conditions. Such methods and systems are suited, above all, for urban traffic, in order to reduce the consumption of fuel and simultaneously also to reduce emission, above all, also for reducing the $CO_2$ emission. This is because in urban traffic the vehicle often comes to a standstill at traffic lights or owing to the traffic and because it is not necessary to run the internal combustion engine. Such a start-up process of the internal combustion engine is referred to as the "automatic start." Similarly, such a shut-off is referred to as the "automatic stop."

The methods and control units for automatically shutting off or starting up a drive unit, that is a vehicle power plant, can be used in a number of different vehicle functions. Thus, for example, within the scope of a so-called "automatic start and stop function" the vehicle power plant is shut-off and also re-started again as a function of the predetermined conditions and in certain traffic situations, for example, at traffic lights or in so-called stop and go traffic. Similarly in the case of vehicles, which are equipped with a hybrid drive unit, consisting of an internal combustion engine (that is, an internal combustion engine with combustion that runs according to the thermodynamic processes of the Otto engine, diesel engine or similar designs) and an electric motor, this internal combustion engine is partially shut-off and started-up again, in order to save fuel and to reduce emissions.

One possibility for designing such methods and systems of the aforementioned type is the automatic shut-off and start-up control device, which is disclosed in DE 101 61 343 A1 and intended for an internal combustion engine. In this case, the control device implements appropriate measures for shutting off the internal combustion engine, when all of the shut-off conditions are met. If the predetermined start-up conditions are satisfied, the control device initiates the appropriate measures for automatically starting up the internal combustion engine.

Under some circumstances it can happen that in vehicles, which are equipped with an automatic shut-off and start-up device, owing to an active shut-off inhibiting condition (for example, the charge state of the battery is below a predetermined limit value), the automatic shut-off process of the internal combustion engine is not carried out. However, this omission is incomprehensible to the driver. Analogous thereto, it can also happen that owing to an active start-up inhibiting condition (for example, the fill level of the vehicle tank is below a predetermined limit value), there is no automatic start-up process. Similarly, this omission is also incomprehensible to the driver. In order to be able to ascertain the cause of such "errors," the still unpublished DE 102007009836 proposes a control unit for controlling an automatic shut-off and/or start-up process of a vehicle power plant. In this case, the control unit sends to a memory unit a memory signal for storage of at least one memory entry, which is assigned to a shut-off inhibiting condition, when all shut-off request conditions are, in fact, fulfilled, yet at the same time at least one shut-off inhibiting condition is active, and, therefore, the vehicle power plant is not shut-off. Under some circumstances it is possible to determine with the memory entry, which can be read out by a readout device, the cause that was responsible for the omitted automatic shut-off process. Analogous thereto, the memory entries can also be made, when an automatically requested automatic start-up process is not initiated.

As soon as a start-up process of the internal combustion engine is requested in a vehicle, either manually by the driver or automatically owing to predetermined start-up conditions (without any start-up inhibiting condition being fulfilled), commensurate measures for starting up the internal combustion engine are initiated. These measures can be designed in a number of different ways as a function of the type of start-up request.

Under some circumstances, it can happen that the start-up of the internal combustion engine from the beginning of the start-up process, for example, from the beginning of a start trigger, set by the driver, up to the completion of a successful start takes longer than is expected by the driver. This discrepancy could lead to customer irritation or even to customer complaints.

Therefore, the object of the invention is to make such customer complaints more comprehensible at least for the personnel of the automotive service center.

This object is achieved by a control unit for controlling a start-up process of a vehicle power plant in a motor vehicle, wherein in response to a start-up request, the control unit emits a start-up signal for initiating corresponding start-up measures for starting up the vehicle power plant, and the control unit sends to a memory unit a memory signal for storage of at least one memory entry, if predetermined conditions are fulfilled. The control unit determines a time duration from the beginning of the start-up process up to the completion of a successful start-up process and sends, as a function of the determined time duration, a time duration dependent memory signal to the memory unit, and that the memory unit makes a time duration dependent memory entry. A readout unit is provided for reading out the memory entries of a memory unit, wherein the memory entries are time duration dependent memory entries, type dependent memory entries, kilometer reading dependent memory entries, and/or cause dependent memory entries. Advantageous further developments are described herein.

Therefore, the fundamental idea is to make it possible to measure the aforementioned time duration and to make it possible to evaluate the time duration by the personnel of the automotive service center by providing a memory unit in which information is stored that explains that, and why, the start-up process of the internal combustion engine did not take place within the conventional time duration.

With respect to controlling a start-up process of a vehicle power plant, in particular an internal combustion engine, the control unit determines the time duration of the start-up process, thus, from the beginning of the start-up process up to the completion of a successful start-up, and sends, as a function of the determined time duration, a time duration dependent memory signal, which can be the time duration itself, to an existing memory unit, which thereupon makes a corresponding time duration dependent memory entry. In this context, the memory unit can be a component of a memory unit, which is present in any event, and whose memory entries can be read out with suitable readout devices in the automotive service centers.

As already stated in the introduction, the start-up process can be activated by manual activation of a suitable operator control element or can be activated automatically, for example, within the framework of a so-called automatic start and stop system. As soon as the start-up request for starting-up or rather for starting-up the drive unit is on hand or this start-up request is determined on the basis of a corresponding algorithm inside the control unit, this control unit sends a start-up signal, which can consist of one or more signals, to the corresponding actuators. At the same time as soon as a start-up request is on hand, a timer is started. This timer determines the time duration of the start-up process. That is, the timer is stopped, as soon as a predetermined, uniform (idle) speed of the drive unit is reached. As a function of the determined time duration, a time duration dependent memory signal, which is a measure for the time duration, is sent to the memory unit. Thereupon, the memory unit makes a time duration dependent memory entry, which in turn gives information about the time duration required for the start-up process. Ideally, the memory unit stores the determined time duration of at least the last start-up process in a time duration memory unit. However, it is also possible to enter a predetermined number of the last determined time duration dependent memory entries, which can be continuously overwritten.

Since the driver, or rather the person who reads out the memory, is really interested in only the entries that are entered on the basis of a start-up process that lasts too long, an advantageous embodiment of the invention can send the time duration dependent memory signal, for example, only if the determined time duration exceeds a predetermined first time duration limit value or rather a time duration dependent memory entry can be made, only if the determined time duration exceeds a predetermined first time duration limit value. In this context, this first time duration limit value should be selected in such a manner that it matches approximately the time duration of a successful (fast) start-up process.

In addition or as an alternative to the time duration memory unit, in which a measure for the time duration of at least one start-up process is stored, the memory unit can be equipped with one or more counting units. Each counting unit can store the number of start-up processes with a specific time duration. That is, each counting unit is assigned a specific time frame, within which the determined time duration of the start-up process can lie. Thus, for example, the number of start-up processes with a normal time duration, with a longer time duration and with an extremely long time duration can be stored. To this end, the inventive memory unit in an advantageous embodiment is equipped in such a manner that in response to the time duration dependent memory signal this memory unit increases by one the value of an existing first counting unit, if the determined time duration or rather the time duration dependent memory signal allows one to detect that the determined time duration is not greater than a predetermined first time duration limit value. Analogous to the above, this first time duration limit value can be predetermined, or rather selected, in such a manner that it matches approximately the time duration of the successful (fast) start-up process.

Analogous to the first counting unit, the memory unit can be equipped with a second counting unit, whose value is increased by one, if the determined time duration is greater than the predetermined first time duration limit value and is not greater than a predetermined second time duration limit value. In this context, the second time duration limit value should be greater than the first time duration limit value by a certain time period.

Analogous to the first and second counting units, the memory unit can be equipped, in addition or as an alternative, with a third counting unit, whose value is increased by one, if the determined time duration of the start-up process is greater than the predetermined second time duration limit value.

If the vehicle is equipped in such a manner that the start-up request can be generated by different measures and/or if the start-up process can be initiated optionally by different measures, then it is practical to make additionally an entry in the memory unit. The entry indicates what type of start, for example, normal start or automatic start, was effected during the determined time duration.

Therefore, in an advantageous embodiment of the invention, the control unit can send additionally a type dependent memory signal to the memory unit, and the memory unit can make a type dependent memory entry. Analogous to the different counting units, a plurality of type memory fields can be provided advantageously. In this context, the type memory field, in which the current value of the type dependent memory entry is supposed to be entered, is in turn predetermined by the determined time duration. The type dependent memory entry is entered advantageously in a predetermined first type memory field, if the determined time duration is not greater than a predetermined first time duration limit value. If the determined time duration is greater than the predetermined first time duration limit value and is not greater than a predetermined second time duration limit value, then the type dependent memory entry is entered in a predetermined second type memory field. If the determined time duration is greater than the predetermined second time duration limit value, then the type dependent memory entry is entered in a predetermined third type memory field. At the same time, the type memory fields can be constructed in such a manner that they can store a predetermined number of previous type dependent memory entries.

In addition to the determined time duration, the counting entries and the type dependent memory entry, it is also possible to make additionally other memory entries. For example, a distance (kilometer or mile) reading dependent memory entry could also be made. In this case, the distance reading dependent memory entry is entered as a function of the distance reading while determining the time duration, thus during the corresponding start-up process.

If a start-up process is started and its time duration is determined, then the current distance reading, e.g., in kilometers or miles, is additionally recorded. The control unit sends, in addition to the time duration dependent memory signal, a distance reading dependent memory signal to the memory unit. Thereupon the memory unit makes a distance reading dependent memory entry. The distance reading dependent memory entry can be, for example, the currently determined distance reading of the vehicle.

Analogous to the different counting units and the type memory fields, a plurality of distance reading memory fields can also be provided advantageously. In this context, the distance reading memory field, in which the current value is supposed to be entered, is in turn predetermined by the determined time duration. The distance reading dependent memory entry is entered advantageously in a predetermined first distance reading memory field, if the determined time duration is not greater than a predetermined first time duration limit value. If the determined time duration is greater than the predetermined first time duration limit value and is not greater than a predetermined second time duration limit value, then the distance reading dependent memory entry is entered in a predetermined second distance reading memory field. If the determined time duration is greater than the predetermined second time duration limit value, then the distance reading dependent memory entry is entered in a predetermined third distance reading memory field. At the same time, the distance reading memory fields can be constructed in such a manner that they can store a predetermined number of previous type dependent memory entries.

If the determined time duration of the start-up process is greater than a predetermined first time duration limit value (that is, the start-up process has lasted longer than is to be expected with this type of start-up process), then the cause can be determined additionally in an advantageous embodiment of the invention. This cause is used by the personnel of the automotive service center as the working basis. Then the control unit sends, together with the determined time duration, a cause dependent memory signal to the memory unit, which thereupon makes a corresponding cause dependent memory entry. In so doing, the cause dependent memory signal and/or the cause dependent memory entry can be configured as a so-called bit word having a predetermined length, where the length of the bit word can be predetermined by the number of determinable causes. If a cause is determined, the value of the bit, assigned to this cause, is set to one, otherwise, it remains zero.

As an alternative, the cause dependent memory entry can also be configured in such a manner that, when a certain cause occurs, a cause counting unit, assigned to this cause, is increased by the value 1. In this way it can be determined at a later date, which causes are responsible especially often for a longer start-up process.

Analogous to the different counting units, the type memory fields, and the distance reading memory fields, a plurality of cause memory fields can be provided advantageously. In this context, the cause memory field, in which the current value is supposed to be entered, is in turn predetermined by the determined time duration. Thus, the cause dependent memory entry is entered in a predetermined second cause memory field, if the determined time duration is greater than a predetermined first time duration limit value and is not greater than a predetermined second time duration limit value. If the determined time duration is greater than the predetermined second time duration limit value, then the cause dependent memory entry is entered in a predetermined third cause memory field. At the same time the cause memory fields can be constructed in such a manner that they can store a predetermined number of previous cause dependent memory entries.

If, in addition to the time duration dependent memory entries, there are a plurality of other memory entries that are to be made and that are entered as a function of the time duration in different memory fields, then the limit values for determining the respective memory fields are predetermined in an identical way ideally for all memory entries.

In the case of the causes that can lead to a prolonged start-up process, it may concern a variety of causes. Correspondingly, the cause dependent memory entry can depend, for example, on the following (determinable) causes, which may occur individually or in combination and can be the cause for a delayed start-up:

(a) The current ambient/outside temperature is less than a predetermined minimum temperature value or is greater than a predetermined maximum temperature value.

(b) There is a mechanical or electrical error or also a combination of a mechanical and an electrical error in the fuel system.

(c) There is a mechanical or electrical error or also a combination of a mechanical and an electrical error in the fuel supply system.

(d) There is a mechanical or electrical error or also a combination of a mechanical and an electrical error in the high pressure pump system.

(e) The current tank content is less than a predetermined minimum tank content.

(f) There is a mechanical or electrical error or also a combination of a mechanical and an electrical error in the starter/start-up system.

(g) There is a mechanical or electrical error or also a combination of a mechanical and an electrical error in the battery system.

(h) The charge state of the battery is less than a predetermined minimum charge state, or the battery is damaged or has aged.

(i) There is a mechanical or electrical error or also a combination of a mechanical and an electrical error in the crankshaft synchronization system.

(j) There is a mechanical or electrical error or also a combination of a mechanical and an electrical error in the cam shaft synchronization system.

(k) There is a mechanical or electrical error or also a combination of a mechanical and an electrical error in the system of the (electronic) immobilization device and/or the anti-theft system, where this anti-theft function can also be included in other (electronic) control units that are integrated into the system with the (electronic) control unit. Such a combined system is also characterized by a possible communication of the (electronic) control units among each other.

(l) There is a mechanical or electrical error or also a combination of a mechanical and an electrical error in the vehicle access system, whose (electronic) control unit is capable of initiating the start-up of the vehicle power plant in response or according to the customer's request. This start function can also be included in other (electronic) control units, which are integrated into the system with the (electronic) control unit. The system can also include other (electronic) control units, which are integrated into the system with the (electronic) control unit. Such a combined system is characterized by a possible communication of the (electronic) control units among each other.

(m) The current ambient/outside pressure of the air is less than a predetermined minimum pressure value or is greater than a predetermined maximum pressure value.

(n) There is an error in the generator communication.

Depending on the size of the memory unit, it is practical to determine a specific number of causes or rather to make only specific cause dependent memory entries.

In order to be able to access the memory entries, the invention includes, besides the control unit, additionally a readout device, which can be connected to the memory unit and which is designed such that the memory entries, which are entered into the memory unit, can be read out and optionally evaluated.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 2 depicts an exemplary configuration of a memory unit; and

FIG. 3 depicts an exemplary display of a readout device.

DETAILED DESCRIPTION OF THE DRAWINGS

Figure 1:
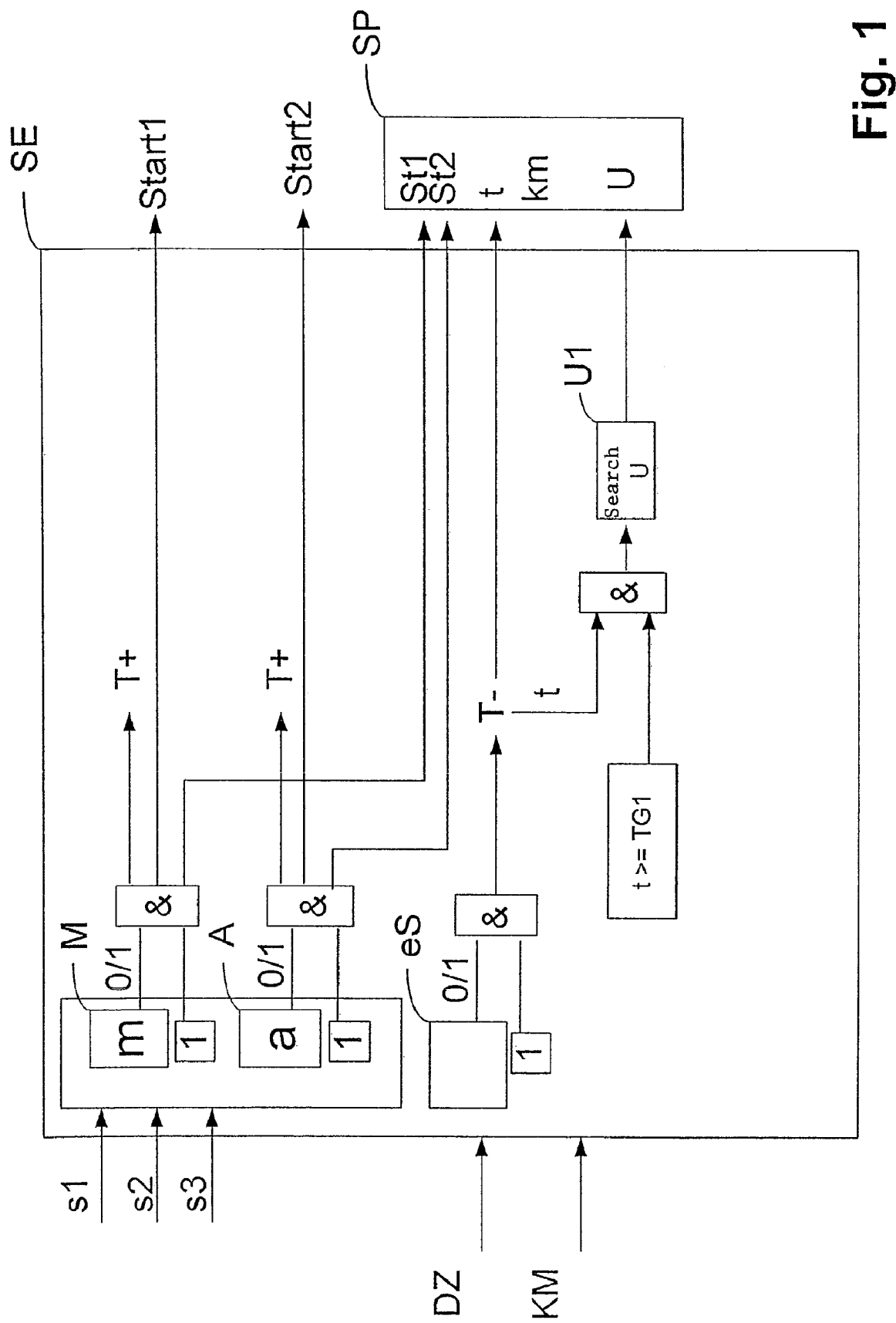
FIG. 1 depicts a simplified inventive control unit for controlling a start-up process of an internal combustion engine in a vehicle.

FIG. 1 shows a control unit SE for controlling a start-up process of a vehicle power plant (not illustrated here), which is constructed as an internal combustion engine, in a motor vehicle. The control unit SE evaluates a variety of input signals s1, s2 and s3 with respect to detecting a start-up request. With the aid of the current input signals s1, s2 and s3 it can be determined whether a manual start "m" or an automatic start "a" is on hand. A manual start m is defined as such a start-up process, which is activated by the driver, or rather by the activation of a suitable start-up operator control element or by rotating a vehicle key in the ignition lock. In contrast, an automatic start a is defined as such a start-up process, which is activated, for example, within the framework of an automatic start function of a so-called start and stop device for automatically starting up the internal combustion engine when the vehicle is stationary.

If the conditions for a manual start m are satisfied, a first evaluation logic M emits a one "1", otherwise a zero "0". When the first evaluation logic M emits a one "1", the downstream first agreement unit & detects this, and thereupon a first start-up signal Start 1 for initiating a corresponding start-up measure for starting up the internal combustion engine is emitted. This first start-up signal Start 1 can consist of several control signals, by which the actuators, provided for the manual start-up, are driven correspondingly. At the same time, a timer T for determining the time duration t of a successful start-up process is started, thus, T+. In addition, when a manual start-up request is determined, the first agreement unit & sends a first type dependent memory signal St1 to a memory unit SP. In this case, the first type dependent memory signal St1 contains the information that it concerns a manually requested start-up process.

If the conditions for an automatic start a are fulfilled, the second evaluation logic A emits, analogous to the first evaluation unit M, a one "1", otherwise a zero "0". When the second evaluation logic A emits a one "1", the downstream second agreement unit & detects this, and thereupon a second start-up signal Start 2 for initiating a corresponding start-up measure for starting up the internal combustion engine is emitted. This second start-up signal Start 2 can consist of several control signals, by which the actuators, provided for the automatic start-up, are driven correspondingly. At the same time, a timer T for determining the time duration t of a successful start-up is also started, thus, T+. In addition, when an automatic start-up request is determined, the second agreement unit & sends a second type dependent memory signal St2 to a memory unit SP. In this case, the second type dependent memory signal St2 contains the information that it concerns an automatically requested start-up process.

As soon as a start-up signal Start 1 or Start 2 for initiating corresponding start-up measures for starting up the internal combustion engine was emitted, a success logic eS monitors at least the rotational speed DZ of the internal combustion engine and detects a successful start-up, when the rotational speed DZ has reached a predetermined idle speed limit value. Thereupon the success logic eS emits a one "1", which is detected in a downstream third agreement unit &. As soon as a successful start-up is detected, the timer T for determining the time duration t of this start-up process is stopped, thus, T−, and the determined time duration t is sent to the memory unit SP. At the same time along with the determined time duration t, a distance reading dependent memory signal km is sent to the memory unit. In this case, this signal contains information about the current distance reading KM.

At the same time, the determined time duration t is compared with a predetermined first time duration limit value TG1. In this case, the first time duration limit value TG1 is predetermined in such a manner that it represents approximately an upper time duration limit value for a flawlessly fast functioning start-up process. This first time duration limit value can be, for example, in a range between 500 ms and 1,000 ms. The first time duration limit value can also be predetermined in a number of different ways as a function of the average type of start-up request. If the determined time duration t is less than the first time duration limit value TG1, then a cause determination logic U1, which determines the possible causes for the prolonged start-up process, is started. Within this cause determination logic U1, predetermined causes can be verified.

After the search for the cause has terminated, the cause determination logic U1 sends a cause dependent memory signal U to the memory unit. This cause dependent memory signal can be configured, for example, as a bit word, where a cause is assigned to each bit. If a specific cause is determined for the excessively long start-up process, the bit, assigned to this cause, is given the value one, otherwise, the value of this bit remains zero.

At this point, the memory unit SP can initiate corresponding memory entries as a function of the determined memory signals St1 and/or St2, km and U and the determined time duration t. One example of the configuration of a memory unit SP with corresponding memory entries is depicted in FIG. 2.

The memory unit SP is divided into several memory fields SPF. For the sake of easier legibility, each memory field SPF is assigned an information field IF, which is not present in the memory unit SP, but rather is intended here only for comprehension.

As already explained in connection with FIG. 1, the control unit SE sends, upon each successful start-up process, a time duration dependent memory signal, in this case the time duration t itself, to the memory unit SP. Thereupon this memory unit SP makes a signal dependent memory entry in the first memory field of line 1—in this case the determined time duration t. It is apparent from FIG. 2 that in this example the last start-up process lasted 1,530 ms.

In addition, in the memory unit the number of start-up processes, which lie within a predetermined time interval, is stored in the corresponding counting units. Thus, a dedicated counting unit is provided for each predetermined time interval. In the case of the memory unit in FIG. 2, the counting unit is in lines 2, 9 and 16. The third counting unit (line 2) stores the number of starts or rather start-up processes, whose time duration t is greater than a predetermined second time duration limit value TG2. The predetermined second time duration limit value can be predetermined, for example, in an order of magnitude of 4,000 ms. According to FIG. 2, 523 of such time durations have already been determined. The second counting unit (line 9) stores the number of starts or rather start-up processes, whose time duration t is greater than a predetermined first time duration limit value TG1 and is not greater than the predetermined second time duration limit value TG2. The predetermined first time duration limit value can be, for example, in an order of magnitude of 1,000 ms. According to FIG. 2, 1,232 of such time durations have already been determined. The first counting unit (line 16) stores the number of starts or rather start-up processes, whose time duration t is not greater than a predetermined first time duration limit value TG1. According to FIG. 2, 78,000 of such time durations have already been determined.

Moreover, the memory unit includes distance reading memory fields in lines 3, 10, 17 (here in kilometers) and the subordinated distance reading memory fields 6, 13 and 19, in which the distance reading dependent memory entries are made.

The distance reading memory field, in which the distance reading dependent memory entry is made, depends on the determined time duration t of the corresponding start-up process.

The distance reading dependent memory entry is made in a third distance reading memory field (line 3), if the determined time duration t of this start-up process is greater than a predetermined second time duration limit value TG2. At the same time, the last entered distance reading dependent memory entry is shifted into the subordinated distance reading memory field in line 6, in which the relevant distance reading of the second to the last start-up process with a time duration t within this time interval is stored. According to FIG. 2, the distance reading at the last start-up process within this time interval was 20,100 km (see line 3), and at the second to the last start-up process within this time interval, 16,543 km (see line 6).

The distance reading dependent memory entry is made in a second distance reading memory field (line 10), if the determined time duration t of this start-up process is greater than a predetermined first time duration limit value TG1 and is not greater than the predetermined second time duration limit value TG2. At the same time the last entered distance reading dependent memory entry is shifted into the subordinated distance reading memory field in line 13, in which the relevant distance reading of the second to the last start-up process with a time duration t within this time interval is stored. According to FIG. 2, the distance reading at the last start-up process within this time interval was 3,122 km (see line 10), and at the second to the last start-up process within this time interval, 3,120 km (see line 13).

The distance reading dependent memory entry is made in a first distance reading memory field (line 17), if the determined time duration t of this start-up process is not greater than the predetermined first time duration limit value TG1. At the same time the last entered distance reading dependent memory entry is shifted into the subordinated distance reading memory field in line 19, in which the relevant distance reading of the second to the last start-up process with a time duration t within this time interval is stored. According to FIG. 2, the distance reading at the last start-up process within this time interval was 22,134 km (see line 17), and at the second to the last start-up process within this time interval, 22,133 km (see line 19).

Moreover, the memory unit includes type memory fields in lines 4, 11 and 18 and subordinated type memory fields in lines 7, 14 and 20, in which the type dependent memory entries are made. The type dependent memory entries are such entries that give information about whether the start-up process was requested manually or automatically. The type memory field, in which the type dependent memory entry is made, depends on the determined time duration t of the corresponding start-up process. The type dependent memory entry is made in a third type memory field (line 4), if the determined time duration t of this start-up process is greater than a predetermined second time duration limit value TG2. At the same time, the last entered type dependent memory entry is shifted into the subordinated type memory field in line 7, in which the relevant data or rather the type of start-up process of the second to the last start-up process with a time duration t within this time interval are stored. According to FIG. 2, the last start-up process within this time interval was a normal start, thus, a manually requested start-up (see line 4). In the case of the second to the last start-up process with a time duration t that was greater than the predetermined second time duration limit value TG2, it concerned a fast start, thus, an automatically requested start-up (see line 7).

The type dependent memory entry is made in a second type memory field (line 11), if the determined time duration t of this start-up process is greater than a predetermined first time duration limit value TG1 and is not greater than the predetermined second time duration limit value TG2. At the same time, the last entered type dependent memory entry is shifted into the subordinated type memory field in line 14, in which the relevant data or rather the type of start-up process of the second to the last start-up process with a time duration t within this time interval are stored. According to FIG. 2, the last start-up process within this time interval was a fast start (see line 11), and the second to the last start-up process within this time interval was also a fast start (see line 14).

The type dependent memory entry is made in a first type memory field (line 18), if the determined time duration t of this start-up process is not greater than the predetermined first time duration limit value TG1, thus, the conditions for a start-up with an expected time duration t are met. At the same time, the last entered type dependent memory entry is shifted into the subordinated type memory field in line 20, in which the relevant data or rather the type of start-up process of the second to the last start-up process with a time duration t within this time interval are stored. According to FIG. 2, the last start-up process within this time interval was a fast start (see line 18), and the second to the last start-up process within this time interval was also a fast start (see line 20).

Moreover, the memory unit SP includes cause memory fields in lines 5 and 12 and subordinated cause memory fields in lines 8 and 15, in which the cause dependent memory entries are made, in order to deposit information about why the corresponding start-up process took longer than expected. Since this information is relevant only in the case of start-up processes, in which the determined time duration t of the start-up process is longer than expected, cause memory fields are not provided for the time interval ranging from 0 to the predetermined first time duration limit value TG1. The cause memory field, in which the cause dependent memory entry, which is configured as a bit word, is made, depends on the determined time duration t of the corresponding start-up process.

The cause dependent memory entry is made in a third cause memory field (line 5), if the determined time duration t of this start-up process is greater than a predetermined second time duration limit value TG2. At the same time, the last entered cause dependent memory entry is shifted into the subordinated cause memory field in line 8, in which the information about the causes of the second to the last start-up process with a time duration t within this time interval is stored. According to FIG. 2, there was a cause, which is assigned to the third bit of this bit word (see line 5), and at the second to the last start-up process within this time interval there was a cause, which is assigned to the first bit of this bit word (see line 8).

The cause dependent memory entry is made in a second cause memory field (line 12), if the determined time duration t of this start-up process is greater than a predetermined first time duration limit value TG1 and is not greater than the predetermined second time duration limit value TG2. At the same time, the last entered cause dependent memory entry is shifted into the subordinated cause memory field in line 15, in which the information about the causes of the second to the last start-up process with a time duration t within this time interval is stored. According to FIG. 2, there was a cause in both cases, and this cause is assigned to the first bit of this bit word (see lines 12 and 15).

This design of the memory unit SP, according to FIG. 2, constitutes only one of many possibilities for designing such a memory unit. Thus, for example, several past start-up processes within a time interval and their relevant information can be stored in a correspondingly designed ring memory. Similarly, the information about the start-up processes, whose time duration t lies within the expected time, could be dispensed with.

In order to read out this information, it is necessary to provide a readout device, which can read out in a suitable manner the various memory fields of the memory unit. The readout device can be designed, for example, in such a manner that the person operating the readout device can select beforehand which information he wants to have displayed.

FIG. 3 shows one example of a display of a readout device AG. In this case, all relevant or rather stored information about the last start-up process, whose time duration t was greater than the predetermined second time duration limit value TG2, is displayed. Hence, the distance reading km and the type of the last start-up process with the very long time duration t are displayed. Furthermore, the causes that were determined are also displayed. Therefore, the person operating the readout device AG can recognize very quickly that the last start-up process with a time duration t greater than the second time duration limit value TG2 was at a kilometer reading of 20,100 km, that in this case it concerns a normal start, and that cause 3 was determined as the possible cause.

At this point, it is possible by use of this display to examine the vehicle with respect to cause 3 and to remedy optionally the problems, which could lead to this cause. Consequently, it is possible to service the vehicle much more easily and faster.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for controlling a start-up process of a vehicle power plant in a motor vehicle, comprising:
    a control unit operatively configured to emit a start-up signal for initiating corresponding start-up measures for starting up the vehicle power plant in response to a start-up request;
    a memory unit operatively configured to receive a memory signal sent from the control unit for storage of at least one memory entry if predetermined conditions are fulfilled; and
    wherein the control unit determines a time duration from a beginning of the start-up process up to a completion of a successful start-up process and sends, as a function of the determined time duration, a time duration dependent memory signal to the memory unit, the memory unit making a time duration dependent memory entry.

2. The apparatus as claimed in claim 1, wherein the time duration dependent memory entry is a measure for the determined time duration.

3. The apparatus as claimed in claim 1, wherein the time duration dependent memory signal is sent only if, and/or the time duration dependent memory entry is made only if, the determined time duration exceeds a predetermined first time duration limit value.

4. The apparatus as claimed in claim 1, wherein, in response to the time duration dependent memory signal, the memory unit increases by one a value of an existing first counting unit, if the determined time duration is not greater than the predetermined first time duration limit value.

5. The apparatus as claimed in claim 4, wherein, in response to the time duration dependent memory signal, the memory unit increases by one a value of an existing second counting unit, if the determined time duration is greater than the predetermined first time duration limit value and is not greater than a predetermined second time duration limit value.

6. The apparatus as claimed in claim 5, wherein, in response to the time duration dependent memory signal, the memory unit increases by one a value of an existing third counting unit, if the determined time duration is greater than the predetermined second time duration limit value.

7. The apparatus as claimed in claim 1, wherein the vehicle power plant is startable in at least two different ways, and wherein the control unit sends additionally a type dependent memory signal to the memory unit, and that the memory unit makes a type dependent memory entry.

8. The apparatus as claimed in claim 7, wherein the type dependent memory entry is entered in a predetermined type memory field, wherein the type memory field, in which the type dependent memory entry is entered, is predetermined as a function of the determined time duration.

9. The apparatus as claimed in claim 8, wherein the type dependent memory entry is entered in a predetermined first type memory field, if the determined time duration is not greater than a predetermined first time duration limit value.

10. The apparatus a claimed in claim 9, wherein the type dependent memory entry is entered in a predetermined second type memory field, if the determined time duration is greater than a predetermined first time duration limit value and is not greater than a predetermined second time duration limit value.

11. The apparatus as claimed in claim 10, wherein the type dependent memory entry is entered in a predetermined third type memory field, if the determined time duration is greater than a predetermined second time duration limit value.

12. The apparatus as claimed in claim 1, wherein the control unit sends additionally a distance reading dependent memory signal to the memory unit, and the memory unit makes a distance reading dependent memory entry.

13. The apparatus as claimed in claim 12, wherein the distance reading dependent memory entry is entered in a predetermined distance reading memory field, wherein the distance reading memory field, in which the distance reading dependent memory entry is entered, is predetermined as a function of the determined time duration.

14. The apparatus as claimed in claim 13, wherein the distance reading dependent memory entry is entered in a predetermined first distance reading memory field, if the determined time duration is not greater than a predetermined first time duration limit value.

15. The apparatus as claimed in claim 14, wherein the distance reading dependent memory entry is entered in a predetermined second distance memory field, if the determined time duration is greater than the predetermined first time duration limit value and is not greater than a predetermined second time duration limit value.

16. The apparatus as claimed in claim 15, wherein the distance reading dependent memory entry is entered in a predetermined third distance memory field, if the determined time duration is greater than the predetermined second time duration limit value.

17. The apparatus as claimed in claim 1, wherein in a case of a determined time duration that is greater than a predetermined first time duration limit value, the control unit sends additionally a cause dependent memory signal to the memory unit, and the memory unit makes a cause dependent memory entry.

18. The apparatus as claimed in claim 17, wherein the cause dependent memory entry is entered in a predetermined cause memory field, wherein the cause memory field, in which the cause dependent memory entry is entered, is predetermined as a function of the determined time duration.

19. The apparatus as claimed in claim 18, wherein the cause dependent memory entry is entered in a predetermined second cause memory field, if the determined time duration is greater than a predetermined first time duration limit value and is not greater than a predetermined second time duration limit value.

20. The apparatus as claimed in claim 19, wherein the cause dependent memory entry is entered in a predetermined third cause memory field, if the determined time duration is greater than the predetermined second time duration limit value.

21. The apparatus as claimed in claim 20, wherein the cause dependent memory entry depends on at least one of the following causes:
   (a) a current ambient/outside temperature being less than a predetermined minimum temperature value or greater than a predetermined maximum temperature value,
   (b) an error in a fuel system,
   (c) an error in a fuel supply system,
   (d) an error in a high pressure pump system,
   (e) a tank content less than a predetermined minimum tank content,
   (f) an error in a starter/start-up system,
   (g) an error in a battery system,
   (h) a charge state of the battery being less than a predetermined minimum charge state, or the battery being damaged or aged,
   (i) an error in a crankshaft synchronization system,
   (j) an error in a cam shaft synchronization system,
   (k) an error in a system of an immobilization device or an anti-theft device,
   (l) an error in a vehicle access system,
   (m) a current ambient/outside air pressure being less than a predetermined minimum pressure value or greater than a predetermined maximum pressure value,
   (n) an error in a generator communication.

22. The apparatus as claimed in claim 1, further comprising:
   a readout device for reading out memory entries of the memory unit.

23. A method of operating a control unit for use in a start-up process of a vehicle power plant in a motor vehicle, the method comprising the acts of:
   receiving a start-up request;
   emitting a start-up signal for initiating corresponding start-up measures for starting-up the vehicle power plant;
   determining a time duration from a beginning of the start-up process up to a completion of a successful start-up process;
   sending, as a function of the determined time duration, a time duration dependent memory signal to a memory unit; and
   storing a time duration dependent memory entry based on the time duration dependent memory signal sent to the memory unit.

* * * * *